US011831515B2

(12) United States Patent
Chandrasekaran et al.

(10) Patent No.: US 11,831,515 B2
(45) Date of Patent: Nov. 28, 2023

(54) CLIENT DEVICE BASED HOME SUBNET MANAGEMENT

(71) Applicant: ARRIS Enterprises LLC, Suwanee, GA (US)

(72) Inventors: Sathish Arumugam Chandrasekaran, Bangalore (IN); Muralidharan Narayanan, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 285 days.

(21) Appl. No.: 17/406,365

(22) Filed: Aug. 19, 2021

(65) Prior Publication Data
US 2022/0123998 A1 Apr. 21, 2022

Related U.S. Application Data

(60) Provisional application No. 63/092,193, filed on Oct. 15, 2020.

(51) Int. Cl.
*H04L 41/12* (2022.01)
*H04W 84/12* (2009.01)

(52) U.S. Cl.
CPC .............. *H04L 41/12* (2013.01); *H04W 84/12* (2013.01)

(58) Field of Classification Search
CPC ................................ H04L 41/12; H04W 84/12
See application file for complete search history.

(56) References Cited

U.S. PATENT DOCUMENTS

| 6,914,905 | B1 | 7/2005 | Yip et al. |
| 7,051,089 | B1* | 5/2006 | Johnson .............. H04L 61/5061 709/223 |
| 2004/0184412 | A1 | 9/2004 | Stephenson et al. |
| 2005/0174998 | A1* | 8/2005 | Vesterinen .......... H04L 61/5007 370/354 |
| 2022/0353705 | A1* | 11/2022 | Raleigh ................. H04W 24/02 |

OTHER PUBLICATIONS

Written Opinion of the International Searching Authority dated Apr. 13, 2023 in International (PCT) Application No. PCT/US2021/046631.

* cited by examiner

*Primary Examiner* — Duc C Ho
(74) *Attorney, Agent, or Firm* — Wenderoth, Lind & Ponack, L.L.P.

(57) ABSTRACT

A system and method are provided for a client device for use with a first Wi-Fi network device, a second Wi-Fi network device, and an external server. The first Wi-Fi network device is configured with a first subnet configuration and the external server has a list of reserved subnet configurations stored therein. The client device comprises a memory and a processor configured to execute instructions stored on said memory to cause said client device to: access the list of reserved subnet configurations from the external server; choose a subnet configuration based on the list of reserved subnet configurations; and instruct the second Wi-Fi network device to establish a second network having the chosen subnet configuration.

15 Claims, 4 Drawing Sheets

CLIENT DEVICE BASED HOME SUBNET MANAGEMENT

BACKGROUND

Embodiments of the present disclosure relate to preventing subnet conflicts in a data communications network.

SUMMARY

Aspects of the present disclosure are drawn to a client device for use with a first Wi-Fi network device, a second Wi-Fi network device, and an external server. The first Wi-Fi network device is configured with a first subnet configuration. The external server has a list of reserved subnet configurations stored therein. The client device comprises a memory and a processor configured to execute instructions stored on said memory to cause said client device to: access the list of reserved subnet configurations from the external server; choose a subnet configuration based on the list of reserved subnet configurations; and instruct the second Wi-Fi network device to establish a second network having the chosen subnet configuration.

In some embodiments, the processor is configured to execute instructions stored on said memory to additionally cause said client device to store the first subnet configuration into the list of reserved subnet configurations of the external server.

In some embodiments, the processor is configured to execute instructions stored on said memory to additionally cause said client device to choose a subnet configuration that is on the list of reserved subnet configurations.

In some embodiments, the processor is configured to execute instructions stored on said memory to additionally cause said client device to choose a subnet configuration that is not on the list of reserved subnet configurations.

In some embodiments, the client device further comprises a graphical user interface (GUI) configured to display the list of reserved subnet configurations and receive a selection by a user of one of the list of reserved subnet configurations. The processor is configured to execute instructions stored on said memory to additionally cause said client device to choose the subnet configuration selected by the user.

Other aspects of the present disclosure are drawn to a method of using a client device with a first Wi-Fi network device, a second Wi-Fi network device, and an external server. The first Wi-Fi network device is configured to establish a network having a first subnet configuration. The external server has a list of reserved subnet configurations stored therein. Said method comprises: accessing, via the processor, the list of reserved subnet configurations from the external server; choosing, via the processor, a subnet configuration based on the list of reserved subnet configurations; and instructing, via the processor, the second Wi-Fi network device to establish a second network having the chosen subnet configuration.

In some embodiments, the method further comprises storing, via the processor, the first subnet configuration into the list of reserved subnet configurations of the external server.

In some embodiments, the method further comprises choosing a subnet configuration that is on the list of reserved subnet configurations.

In some embodiments, the method further comprises choosing a subnet configuration that is not on the list of reserved subnet configurations.

In some embodiments, the method further comprises displaying, via a GUI, the list of reserved subnet configurations; and receiving, via the graphical user interface, a selection by a user of one of the list of reserved subnet configurations, wherein said choosing the subnet configuration comprises choosing the subnet configuration selected by the user.

Other aspects of the present disclosure are drawn to a non-transitory, computer-readable media having computer-readable instructions stored thereon, the computer-readable instructions being capable of being read by a processor in a client device for use with a first Wi-Fi network device, a second Wi-Fi network device, and an external server. The first Wi-Fi network device is configured to establish a network having a first subnet configuration. The external server has a list of reserved subnet configurations stored therein. The computer-readable instructions are capable of instructing the client device to perform the method comprising: accessing, via the processor, the list of reserved subnet configurations from the external server; choosing, via the processor, a subnet configuration based on the list of reserved subnet configurations; and instructing, via the processor, the second Wi-Fi network device to establish a second network having the chosen subnet configuration.

In some embodiments, the computer-readable instructions are capable of instructing the client device to perform the method further comprising storing, via the processor, the first subnet configuration into the list of reserved subnet configurations of the external server.

In some embodiments, the computer-readable instructions are capable of instructing the client device to perform the method wherein choosing a subnet configuration comprises choosing a subnet configuration that is on the list of reserved subnet configurations.

In some embodiments, the computer-readable instructions are capable of instructing the client device to perform the method wherein choosing a subnet configuration comprises choosing a subnet configuration that is not on the list of reserved subnet configurations.

In some embodiments, the computer-readable instructions are capable of instructing the client device to perform the method further comprising: displaying, via a GUI, the list of reserved subnet configurations; and receiving, via the graphical user interface, a selection by a user of one of the list of reserved subnet configurations, wherein said choosing the subnet configuration comprises choosing the subnet configuration selected by the user.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Today's homes and offices often have data communications networks that employ various network devices to connect client devices and Internet resources. In many network protocols, such as the TCP/IP protocol, it is possible to logically partition a network into subnetworks, or subnets for short. Subnets have many benefits: subnets allow network addresses to be allocated more efficiently; allow different sections of an address space to be managed by separate organizations; or allow partitioning of the network to increase security. In a home environment, for example, one subnet can be dedicated to home automation and security devices such as a Ring doorbell, while another subnet can be dedicated to media devices such videogame consoles or TV set-top boxes.

Creating and administering subnets also requires more detailed knowledge of the network architecture. Problems can occur when two or more subnets make use of overlapping IP addresses. Normally, each client device on a network has a unique IP address; however, when two subnets are configured incorrectly, it is possible for two client devices on separate subnets to have the same IP address, which results in a network address conflict, where data intended for one IP address may be routed to multiple client devices.

What is needed is a system and method for avoiding conflicts with subnets in a data communications network.

A system and method in accordance with the present disclosure allows the configuration of subnets on network devices while avoiding conflicts with reserved subnets in a data communications network.

In accordance with the present disclosure, a client device in a data network obtains a list of reserved subnets, which are subnets already in use or set aside for future use. When a network device in the data network is being configured with a subnet configuration, the client device allows the network device to be configured with a reserved subnet, when that reserved subnet is allowed for that network device. The client device also allows the network device to be configured with subnets not on the list of reserved subnets, when the reserved subnets are not allowed for that network device.

An example system and method for configuring subnets while avoiding subnet conflicts in accordance with aspects of the present disclosure will now be described in greater detail with reference to FIGS. 1-4B.

Figure 1:
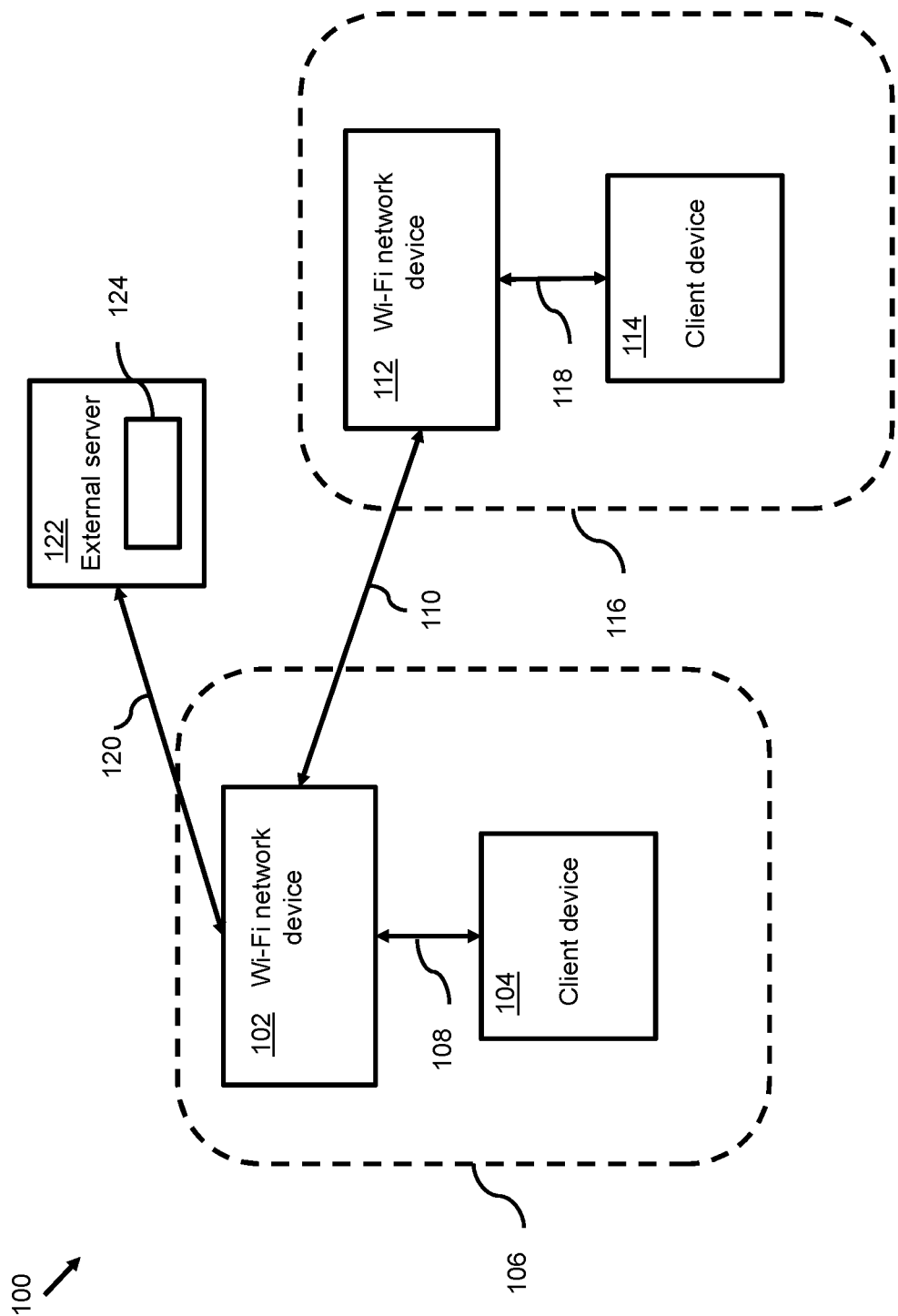
FIG. 1 illustrates a network.

FIG. 1 illustrates network 100.

As shown in the figure, network 100 includes Wi-Fi network device 102, client device 104, Wi-Fi network device 112, client device 114, and external server 122. Wi-Fi network device 102 is arranged to communicate to client device 104 by communications channel 108, to Wi-Fi network device 112 by communications channel 110, and to external server 122 by communications channel 120. Wi-Fi network device 112 is arranged to communicate to client device 114 by communications channel 118. Wi-Fi network device 102 and client device 104 are included in subnet 106. Wi-Fi network device 112 and client device 114 are included in subnet 116. List 124 is contained in external server 122.

Wi-Fi network devices 102 and 112 may be any devices or systems that are operable to allow data to flow from one discrete device or network to another. Wi-Fi network devices 102 and 112 may perform such functions as web acceleration and HTTP compression, flow control, encryption, redundancy switchovers, traffic restriction policy enforcement, data compression, TCP performance enhancements (e.g., TCP spoofing), quality of service functions (e.g., classification, prioritization, differentiation, random early detection, TCP/UDP flow control), bandwidth usage policing, dynamic load balancing, address translation, and routing. In this non-limiting example, Wi-Fi network devices 102 and 112 may be routers, gateways, extenders, or mesh network devices.

Client devices 104 and 114 are any devices or methods that present content and accept inputs from users. In this non-limiting example, client devices 104 and 114 may be smart phones, tablets, personal computers, TV set-top boxes, videogame consoles, or smart media devices.

Communications channels 108, 110, 118, and 120 are any device or system that facilitate communications between devices or networks. In this non-limiting example, communications channels 108, 110, and 118 are Wi-Fi channels. The term Wi-Fi as used herein may be considered to refer to any of Wi-Fi 4, 5, 6, 6E, or any variation thereof. Communications channel 120 may include physical media or wiring, such as coaxial cable, optical fiber, or digital subscriber line (DSL); or wireless links, such as satellite or terrestrial radio links; or a combination of any of these examples or their equivalents. The data communicated on such network can be implemented using a variety of protocols on a network such as a wide area network (WAN), a virtual private network (VPN), a metropolitan area network (MAN), a system area network (SAN), a DOCSIS network, a fiber optics network (including fiber-to-the-home, fiber-to-the-X, or hybrid fiber-coax), a digital subscriber line (DSL), a public switched data network (PSDN), a global Telex network, or a 2G, 3G, 4G or 5G, for example. Though communications channel 120 is shown as a single link, it is contemplated that communications channel 120 may contain multiple links and devices including routers, gateways, and servers.

Subnets 106 and 116 logical partitions in network 100 created by known methods of dividing network address spaces. In this non-limiting example, subnets 106 and 116 are specified by well-established practices of masking specific bits of IP addresses.

List 124 comprises subnet addresses, or subnet configurations, that are reserved for various purposes in network 100.

In normal operation, subnet 106 is configured to reserve a block of IP addresses to be used by client devices connecting to Wi-Fi network device 102. Subnet 116 is configured to reserve a block of IP addresses to be used by client devices connecting to Wi-Fi network device 112. When network 100 is correctly configured, client device 104 is assigned an IP address from subnet 106 and client device 114 is assigned an IP address from subnet 116. Since subnet 106 and subnet 116 do not overlap, the IP addresses of client devices 104 and 114 cannot be identical.

However, subnets 106 and 116 may be configured incorrectly such that their address spaces overlap. In this case, it is possible that client device 104 and client device 114 are assigned the same IP address, with the result that data sent from external server 122 to client device 104 may inadvertently be transmitted to client device 114.

FIG. 1 illustrates network 100 with subnets 106 and 116. If subnets 106 and 116 are configured incorrectly and have overlapping address spaces, client devices 104 and 114 in network 100 may experience network conflicts. A method of avoiding conflicts in network 100 will now be discussed with reference to FIG. 2.

Figure 2:
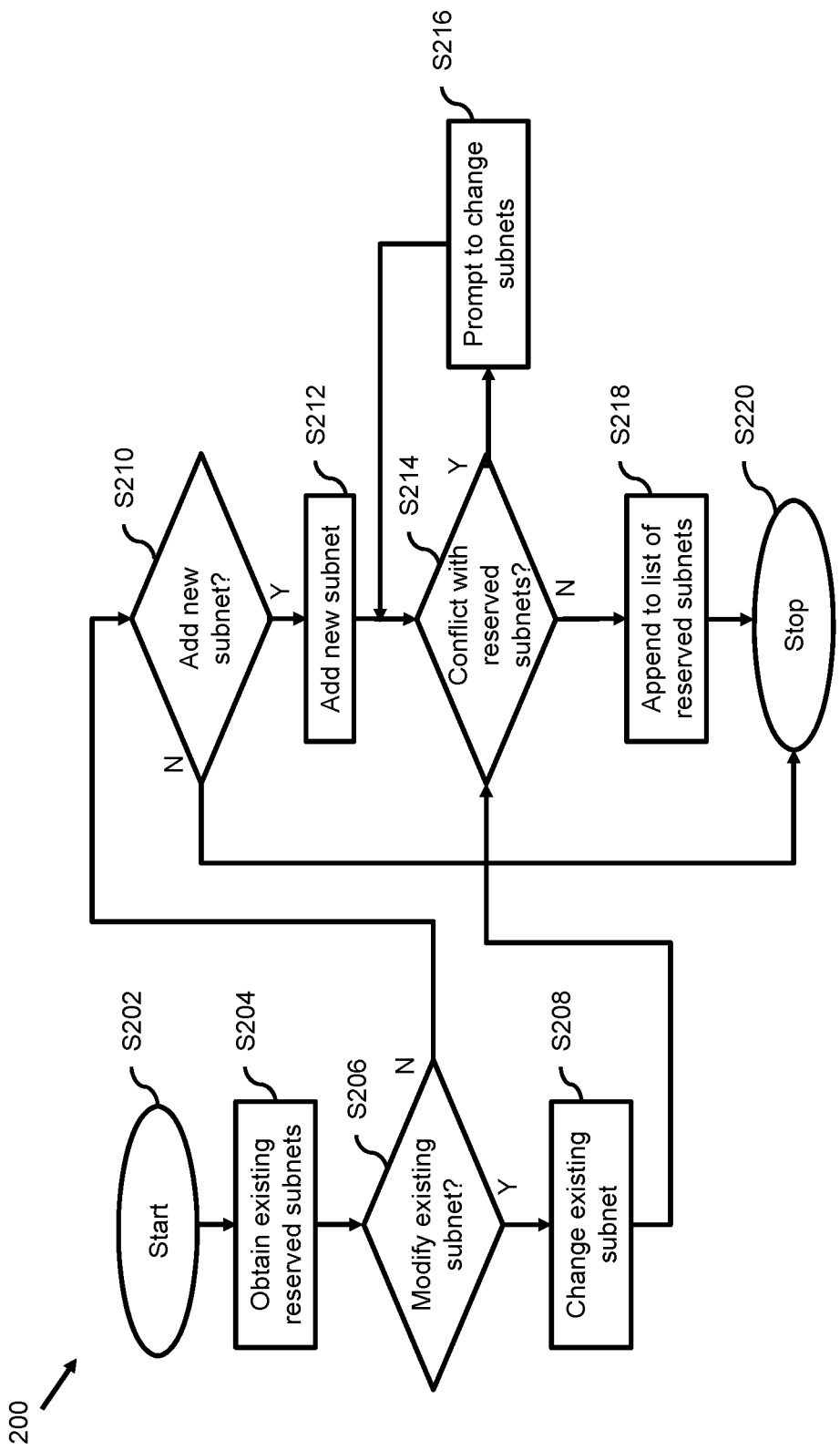
FIG. 2 illustrates a method of avoiding conflicts in the network, in accordance with aspects of the present invention.

FIG. 2 illustrates an algorithm to be executed by a processor for avoiding conflicts in network 100, in accordance with aspects of the present invention.

As shown in the figure, algorithm 200 starts (S202) and a list of reserved subnets is obtained (S204). In operation and referring to FIG. 1, client device 104 obtains list 124 from external server 122. In this non-limiting example, list 124 is created by manually by a user or system administrator. In another embodiment, list 124 is automatically generated by Wi-Fi network devices 102 and 112.

Returning to FIG. 2, it is determined whether an existing subnet is being modified (S206) or whether a new subnet is being added (S210). If an existing subnet is being modified (Y on S206), then that subnet may be selected and changed (S208). This will be discussed in detail with reference to FIGS. 3 and 4A-B.

Figure 3:
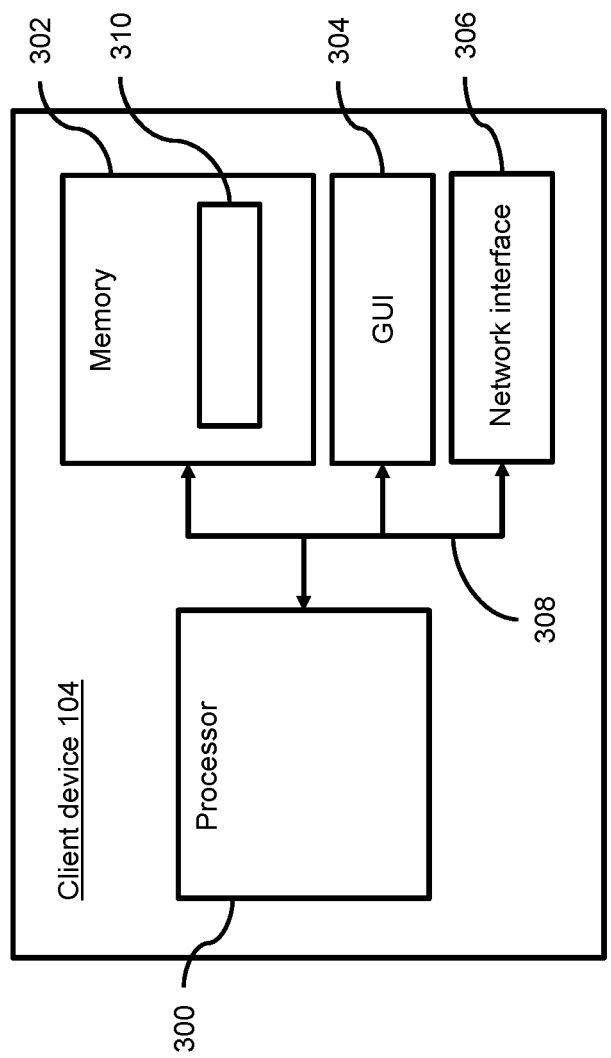
FIG. 3 illustrates a client device, in accordance with aspects of the present invention.

FIG. 3 illustrates client device 104, in accordance with aspects of the present invention.

As shown in the figure, client device 104 includes processor 300, memory 302, graphical user interface (GUI) 304, network interface 306, and bus 308. Program 310 is contained in memory 302 and runs on processor 300.

Processor 300 is any device or method capable of controlling general operations of client device 104 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 104.

Memory 302 is any device or method capable of storing data and instructions used by client device 104 and includes, but is not limited to, random-access memory (RAM), dynamic random-access memory (DRAM), a hard drive, a solid-state drive, read-only memory (ROM), erasable programmable read-only memory (EPROM), electrically erasable programmable read-only memory (EEPROM), flash memory, embedded memory blocks in an FPGA, or any other various layers of memory hierarchy.

Network interface 306 may also be referred to as a wireless communication circuit, such as a Wi-Fi wireless local area network (WLAN) interface radio transceiver, and is operable to communicate with Wi-Fi network device 102. Network interface 306 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 104 can also be equipped with a radio transceiver or wireless communication circuit to implement a wireless connection in accordance with any Bluetooth protocols, Bluetooth Low Energy (BLE), or other short-range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

In this example, processor 300, memory 302, and network interface 306 are illustrated as individual devices of client device 104. However, in some embodiments, at least two of processor 300, memory 302, and network interface 306 may be combined as a unitary device. Further, in some embodiments, at least one of processor 300, memory 302, and network interface 306 may be implemented as a computer having non-transitory computer-readable media for carrying or having computer-executable instructions or data structures stored thereon. Such non-transitory computer-readable recording medium refers to any computer program product, apparatus, or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk, and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to processor 300 such that the processor may read information from, and write information to the tangible computer-readable media. In the alternative, the tangible computer-readable media may be integral to processor 300. Processor 300 and the tangible computer-readable media may reside in an integrated circuit (IC), an ASIC, or large scale integrated circuit (LSI), system LSI, super LSI, or ultra LSI components that perform a part or all of the functions described herein. In the alternative, processor 300 and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Bus 308 may be any device or system that provides data communications between processor 300, memory 302, GUI 304, and network interface 306. Bus 308 can be one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnects (PCI) bus.

Program 310 controls the operations of client device 104. Program 310, having a set (at least one) of program modules, may be stored in memory 302 by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

GUI 304 is any device or method capable of presenting information and accepting user inputs on client device 104 and includes, but is not limited to, a liquid crystal display (LCD), a thin film transistor (TFT) display, a light-emitting diode (LED) display, or other similar display device, including a display device having touch screen capabilities so as to allow interaction between the user and client device 104. In other embodiments, user interface 306 may include a button, a speaker, or a microphone.

GUI 304 will now be further discussed with reference to FIGS. 4A-B.

Figure 4B:
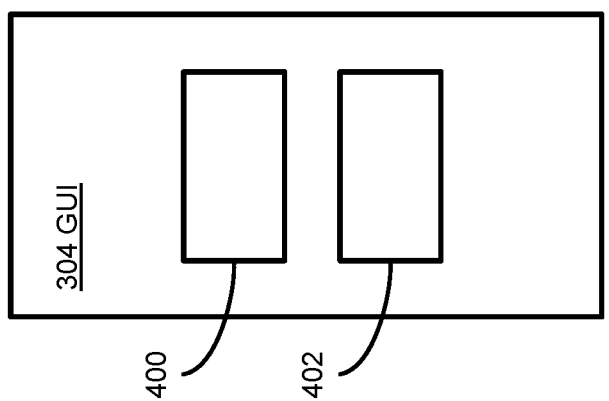
FIGS. 4A-B illustrate a GUI, in accordance with aspects of the present invention.
Figure 4A:
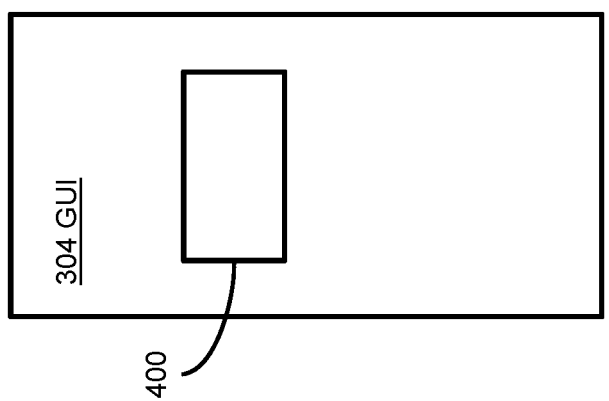

FIGS. 4A-B illustrate GUI 304, in accordance with aspects of the present invention.

As shown in the figures, GUI 304 indicates or displays subnet configurations 400 and 402. Subnet configuration 400 contains subnet addresses that are included in list 124. Subnet configuration 402 contains subnet addresses that are not included in list 124.

Returning to FIG. 2, if an existing subnet is being modified (Y on S206), then a facility for selecting and changing an existing subnet is provided (S208). In operation and referring to FIG. 3, program 310 runs on processor 300 causing client device 104 to obtain list 124 from external server 122.

For purposes of discussion, suppose that the configuration of subnet 106 is to be modified. Subnet configuration 400, which corresponds to the configuration of subnet 106, is displayed on GUI 304, as shown on FIG. 4A. Since subnet 106 has already been established by Wi-Fi network device 102, the subnet addresses of subnet 106 are included in list 124.

Returning to FIG. 2, if an existing subnet is not being modified (N on S206) and a new subnet is being added (Y on S210), then a facility for adding a new subnet is provided (S212). In operation and referring to FIG. 3, program 310 runs on processor 300 causing client device 104 to obtain list 124 from external server 122.

For purposes of discussion, suppose that Wi-Fi network device 112 is being initialized and subnet 116 is being configured for the first time. Subnet addresses for subnet 116 should not conflict with those of subnet 106. As shown in FIG. 4B, subnet configuration 400, which corresponds to the configuration of subnet 106, is displayed on GUI 304. Subnet addresses of subnet 106 are included in list 124 of reserved subnet addresses. To configure subnet 116, program 310 displays subnet addresses not included in list 124; this is represented by subnet configuration 402 shown on FIG. 4B.

Returning to FIG. 2, after an existing subnet configuration is changed (S208) or a new subnet configuration is added (S212), conflicts with reserved subnets are checked (S214). In operation and referring to FIG. 1, processor 300 on client device 104 compares the proposed subnet configuration against subnet addresses contained in list 124 (S214).

Returning to FIG. 2, if there are conflicts (Y on S214), processor 300 displays a dialog on GUI 304 to change the subnet configuration (S216) and subnet conflicts are checked again (S214). If there are no conflicts (N on S214), processor 300 adds the new or modified subnet addresses to list 124 (S218) and algorithm 200 stops (S220).

If neither existing subnet is being modified (N on S206) nor new subnet is being added (N on S210), then algorithm 200 stops (S220).

Data communications networks used in today's homes and offices may contain multiple network devices which may employ their own individual subnets. If these subnets are configured incorrectly such that their address spaces overlap, network conflicts can occur.

In accordance with the present disclosure, a client device in a data network obtains a list of reserved subnets. When a network device in the data network is being configured, the client device allows the network device to be configured with reserved subnet addresses, if those reserved subnet addresses are allowed for that network device. The client device also allows the network device to be configured with subnet addresses that not on the list of reserved subnets, to prevent conflicting with subnets already used by other network devices.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a first Wi-Fi network device, a second Wi-Fi network device, and an external server, the first Wi-Fi network device being configured with a first subnet configuration, the external server having a list of reserved subnet configurations stored therein, said client device comprising:
    a memory; and
    a processor configured to execute instructions stored on said memory to cause said client device to:
        access the list of reserved subnet configurations from the external server;
        choose a subnet configuration based on the list of reserved subnet configurations; and
        instruct the second Wi-Fi network device to establish a second network having the chosen subnet configuration.

2. The client device of claim 1, wherein said processor is configured to execute instructions stored on said memory to additionally cause said client device to store the first subnet configuration into the list of reserved subnet configurations of the external server.

3. The client device of claim 1, wherein said processor is configured to execute instructions stored on said memory to additionally cause said client device to choose a subnet configuration that is on the list of reserved subnet configurations.

4. The client device of claim 1, wherein said processor is configured to execute instructions stored on said memory to additionally cause said client device to choose a subnet configuration that is not on the list of reserved subnet configurations.

5. The client device of claim 1, further comprising:
   a graphical user interface configured to display the list of reserved subnet configurations and receive a selection by a user of one of the list of reserved subnet configurations,
   wherein said processor is configured to execute instructions stored on said memory to additionally cause said client device to choose the subnet configuration selected by the user.

6. A method of using a client device with a first Wi-Fi network device, a second Wi-Fi network device, and an external server, the first Wi-Fi network device being configured to establish a network having a first subnet configuration, the external server having a list of reserved subnet configurations stored therein, said method comprising:
   accessing, via the processor, the list of reserved subnet configurations from the external server;
   choosing, via the processor, a subnet configuration based on the list of reserved subnet configurations; and
   instructing, via the processor, the second Wi-Fi network device to establish a second network having the chosen subnet configuration.

7. The method of claim 6, further comprising storing, via the processor, the first subnet configuration into the list of reserved subnet configurations of the external server.

8. The method of claim 6, wherein choosing a subnet configuration comprises choosing a subnet configuration that is on the list of reserved subnet configurations.

9. The method of claim 6, wherein choosing a subnet configuration comprises choosing a subnet configuration that is not on the list of reserved subnet configurations.

10. The method of claim 6, further comprising:
    displaying, via a graphical user interface, the list of reserved subnet configurations; and
    receiving, via the graphical user interface, a selection by a user of one of the list of reserved subnet configurations,
    wherein said choosing the subnet configuration comprises choosing the subnet configuration selected by the user.

11. A non-transitory, computer-readable media having computer-readable instructions stored thereon, the computer-readable instructions being capable of being read by a processor in a client device for use with a first Wi-Fi network device, a second Wi-Fi network device, and an external server, the first Wi-Fi network device being configured to establish a network having a first subnet configuration, the external server having a list of reserved subnet configurations stored therein, wherein the computer-readable instructions are capable of instructing the client device to perform the method comprising:
    accessing, via the processor, the list of reserved subnet configurations from the external server;
    choosing, via the processor, a subnet configuration based on the list of reserved subnet configurations; and
    instructing, via the processor, the second Wi-Fi network device to establish a second network having the chosen subnet configuration.

12. The non-transitory, computer-readable media of claim 11, wherein the computer-readable instructions are capable of instructing the client device to perform the method further comprising storing, via the processor, the first subnet configuration into the list of reserved subnet configurations of the external server.

13. The non-transitory, computer-readable media of claim 11, wherein the computer-readable instructions are capable of instructing the client device to perform the method wherein choosing a subnet configuration comprises choosing a subnet configuration that is on the list of reserved subnet configurations.

14. The non-transitory, computer-readable media of claim 11, wherein the computer-readable instructions are capable of instructing the client device to perform the method wherein choosing a subnet configuration comprises choosing a subnet configuration that is not on the list of reserved subnet configurations.

15. The non-transitory, computer-readable media of claim 11, wherein the computer-readable instructions are capable of instructing the client device to perform the method further comprising:
    displaying, via a graphical user interface, the list of reserved subnet configurations; and
    receiving, via the graphical user interface, a selection by a user of one of the list of reserved subnet configurations,
    wherein said choosing the subnet configuration comprises choosing the subnet configuration selected by the user.

* * * * *